United States Patent [19]  
Krogmann

[11] Patent Number: 4,807,138  
[45] Date of Patent: Feb. 21, 1989

[54] DEVICE FOR DETERMINING THE NORTH DIRECTION

[75] Inventor: Uwe Krogmann, Überlingen-Nussdorf, Fed. Rep. of Germany

[73] Assignee: Bodenseewerk Geratetechnik GmbH, Überlingen/Bodensee, Fed. Rep. of Germany

[21] Appl. No.: 926,976

[22] Filed: Nov. 4, 1986

[30] Foreign Application Priority Data

Nov. 22, 1985 [DE] Fed. Rep. of Germany ....... 3541259

[51] Int. Cl.$^4$ .................. G06G 7/78; G01C 19/38
[52] U.S. Cl. ...................... 364/453; 364/566; 364/571.03; 33/318; 73/504
[58] Field of Search .............. 364/571, 565, 566, 443, 364/453, 454; 33/316, 320, 324, 326, 328; 73/504, 178 R

[56] References Cited

U.S. PATENT DOCUMENTS 3,763,358 10/1973 Cargille ................. 364/453  
4,038,527 7/1977 Bradie et al. ............ 364/453  
4,114,437 9/1978 Krogmann ............... 364/453 X  
4,262,861 4/1981 Goldstein ................ 364/453 X  
4,321,678 3/1982 Krogmann ............... 33/320 X  
4,693,114 5/1987 De Carlo et al. ........... 73/178 R Primary Examiner—Gary Chin  
Assistant Examiner—Thomas G. Black  
Attorney, Agent, or Firm—Lee & Smith

[57] ABSTRACT

The north direction shall be determined by a carrier fixed two-axis rate gyro having a substantially vertical spin axis from the two components of the horizontal component of the rotary speed of the earth. Deviations of the position of the rate gyro from an exact vertical alignment of the spin axis are detected by two accelerometers which provide acceleration signals. The ratio of acceleration signals and acceleration due to gravity provide values of the angles of inclination. Correction signals are formed out of the accelerometer signals and are subtracted from the signals obtained by the rate gyro. One of the correction signals compensates for the component of the vertical component of the rotary speed of the earth falling into the direction of the input axes of the rate gyro. Another signal compensates the rotary speed of the carrier relative to the earth and thus rotatory interferences. The tangent of the true azimuth angle is obtained by forming quotients of the rate gyro signals corrected in this way.

6 Claims, 5 Drawing Sheets

DEVICE FOR DETERMINING THE NORTH DIRECTION

The invention relates to a device for determining the north direction, comprising (a) two-axis rotary speed sensor means which are arranged carrier-fixed (strapdown) having a first input axis and a second input axis perpendicular to the first one in a plane which is at least approximately horizontal, (b) first accelerometric means which respond to acceleration in the direction of the first input axis (c) second accelerometric means which respond to acceleration in the direction of the second input axis (d) signal processing means to which the signals of the rotary speed sensor means and of the accelerometric means are supplied for generating an output signal indicative of the angle between a reference direction and north.

From DE-B No. 27 41 274 an apparatus for automatical determination of the north direction is known wherein a two-axis gyro is provided having a substantially vertical spin axis. A position pick-off and a torquer are provided at each of two mutually orthogonal input axes of the gyro. The signal of each of the position pick-offs associated with one input axis is, crosswise, applied to the torquer of the respective other input axis, to electrically restrain the gyro. Therewith the spin axis of the gyro is arranged vertically. The signals supplied to the two torquers are simultaneously applied to the north deviation computer which provides, from the ratio of the signals a signal representing the deviation of an apparatus-fixed reference direction from north. If the reference direction is identical with one of the two input axes, then the angle of north deviation is equal to the arcus tangent of the ratio of the torques exerted by the two torquers due to the applied signals. In practice this is an electrical restrained, two-axis rate gyro which measures the two components of the horizontal component of the rotary speed of the earth falling into the direction of the input axes from which ratio the angle of north deviation resulting from this ratio. As already mentioned it is assumed herein that the spin axis of the gyro is exactly vertical.

From DE-B No. 27 41 274 it is furthermore known to provide a pair of accelerometers, which are arranged in a fixed position to the housing of the gyro and the sensitivity axes of which are mutually orthogonal and extend parallel to the two input axes. Signal processing means are provided to which both the signals of the rate gyro and the accelerometer signals are supplied. The signal processing means calculate the true angle of north deviation, taking into account the inclination of the gyro spin axis relative to the vertical, as determined by the accelerometers. Thereby it is possible to determine the angle of north deviation or azimuth angle to north also, if the gyro spin axis is not aligned exactly vertically.

In an embodiment of DE-B No. 27 41 274 the signal obtained as quotient of the signals of the rate gyro is applied as an estimated value of the north deviation together with error signals of the accelerometers to an error signal computer which is adapted for computation of error signals (of these transformation parameters) taking the estimated values of the transformation parameters between a rate gyro-fixed and an earth-fixed coordinate system as a basis. These estimated values of the transformation parameters are, at first, determined by the quotient of the signals of the rate gyro. The error signals obtained in this way, which in such case may be weighted, are supplied to a correction signal computer for computation of correction signals for the transformation parameter. A transformation parameter computer provides corrected transformation parameters. These corrected transformation parameters are, in turn, applied to the correction signal computer in a closed loop as new estimated values of the transformation parameters for the computation of the error signals. Simultaneously the corrected transformation parameters are supplied to a computer for computation of the resulting corrected north deviation and/or of a function thereof. This kind of signal processing by transformation parameters in a closed loop indeed leads to very accurate results but requires a considerable computer expenditure.

From EP-A No. 106 066 an apparatus for determining the north direction is known wherein the azimuth angle to north is determined from the components of the horizontal component of the rotary speed of the earth by an two-axis gyro with a vertical spin axis. In order to suppress the influence of disturbing movements about the input axes the gyro is arranged together with accelerometers on a platform mounted on gimbals. The accelerometers are connected to torquers of the gyro. Pick-offs of the gyro control platform servomotors. In another embodiment of EP-A No. 106 066 these processes are simulated in a computer with a "virtual platform".

This arrangement is also very expensive.

U.S. Pat. No. 3,279,086 shows an assembly comprising a two-axis gyro with a substantially vertical spin axis, wherein pick-off signals are applied torquers. There, however, no ratio of torquer signals is formed, as with DE-B-No. 2,741,274. Rather is the north pick-off connected to a servomotor through an amplifier, one input axis being rotated towards north by this servomotor. Accelerometers are provided which act on the restraining loops, i.e. the signals of which are applied to the torquer.

It is the object of the invention to provide a device of the kind mentioned in the beginning, wherein the influence of misalignment of the input axes and rotational disturbance is eliminated by simple means.

According to the invention this object is achieved in that (e) the signals obtained from the rotary speed sensor means by the signal processing means, which signals would be proportional to the components of the horizontal component of the rotary speed of the earth falling into the directions of the input axes if the plane of the input axes exactly were horizontally aligned, are superposed by correction signals derived from the associated accelerometric means when said plane is not aligned horizontally, said correction signals compensating ($e_1$) components of the vertical component of the rotary speed of the earth falling into the directions of the input axes and ($e_2$) the rotary speed of the carrier relative to the earth, and (f) the signal processing means comprise furthermore quotient forming means to form the quotient of the rotary speed signals corrected in this way.

The signals obtained by the rotary speed sensor means, e.g. a rate gyro, comprise beside the respective component of the horizontal component of the rotary speed of the earth also components due to the vertical component of the rotary speed of the earth when it is misaligned, thus e.g. when the spin axis of a rate gyro is not exactly vertical. The angle between input axis and horizontal can be derived from the ratio of acceleration signals and the acceleration due to gravity, and a correction signal can be generated with the known vertical component of the rotary speed of the earth. A further correction signal which takes into account the rotary speed of the carrier relative to the earth, which naturally is also detected by the rate gyro, can also be derived from the attitude angle obtained from the ratio of acceleration and acceleration due to gravity.

Modifications of the invention are subject matter of the sub-claims.

Two embodiments of the invention will now be described in greater detail with reference to the accompanying drawings.

Figure 1:
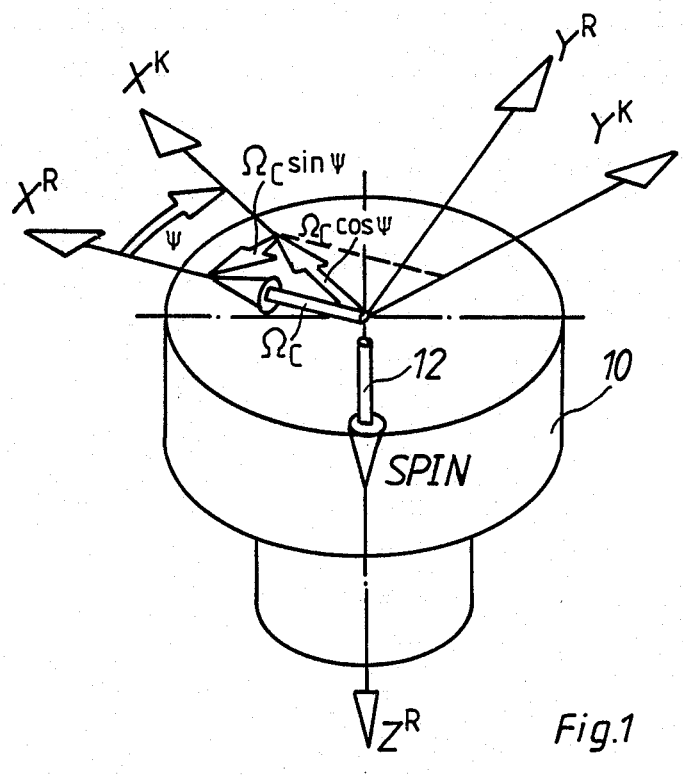
FIG. 1 illustrates the basic principle of a north seeker with a two-axis rate-gyro installed carrier-fixed.

In FIG. 1 numeral 10 designates a two-axis electrically restrained rate gyro which can be formed similar to the kind described in DE-B-No. 27 41 274. In FIG. 1 the spin vector 12 is aligned exactly vertically to the bottom that is to the direction $Z^R$ of an earth fixed coordinate system. The horizontal component $\Omega_c$ of the rotary speed of the earth is aligned to north, that is to the direction $X^R$ of the earth-fixed coordinate system. The rate gyro 10 has two input axis $X^K$ and $Y^K$ in a plane perpendicular to the spin axis 12. $\Psi$ designates the angle between the north direction $X^R$ and the input axis $X^K$ of the rate gyro 10. It can easily be recognized from FIG. 1 that the component $\Omega_c \cdot \cos\Psi$ of the horizontal component of the rotary speed is effective in the direction of the input axis $X^K$ while the component $\Omega_c \cdot \sin\Psi$ is effective in the direction of the input axis $Y^K$. These two rotary speeds are measured by the two-axis rate gyro 10 and are transformed into the corresponding signals. The tangent of the north deviation- or azimuth angle $\Psi$ is obtained by forming the quotient of these signals. The ambiguity of the tangent function can be taken into account by a suitable quadrant logic as also described in DE-B-No. 27 41 274. This kind of determining the north direction by a rate gyro requires that the spin axis 12 is exactly vertical, the input axes $X^K$ and $Y^K$ are arranged mutually orthogonal in one horizontal plane and perpendicular to the spin axis, that furthermore gyro errors can be neglected and no interferences due to vibrations occur.

In general the rate gyro 10 is not aligned exactly vertically with its spin axis 12, when the rate gyro is mounted in carrier-fixed manner. These conditions are shown in FIG. 2.

Figure 2:
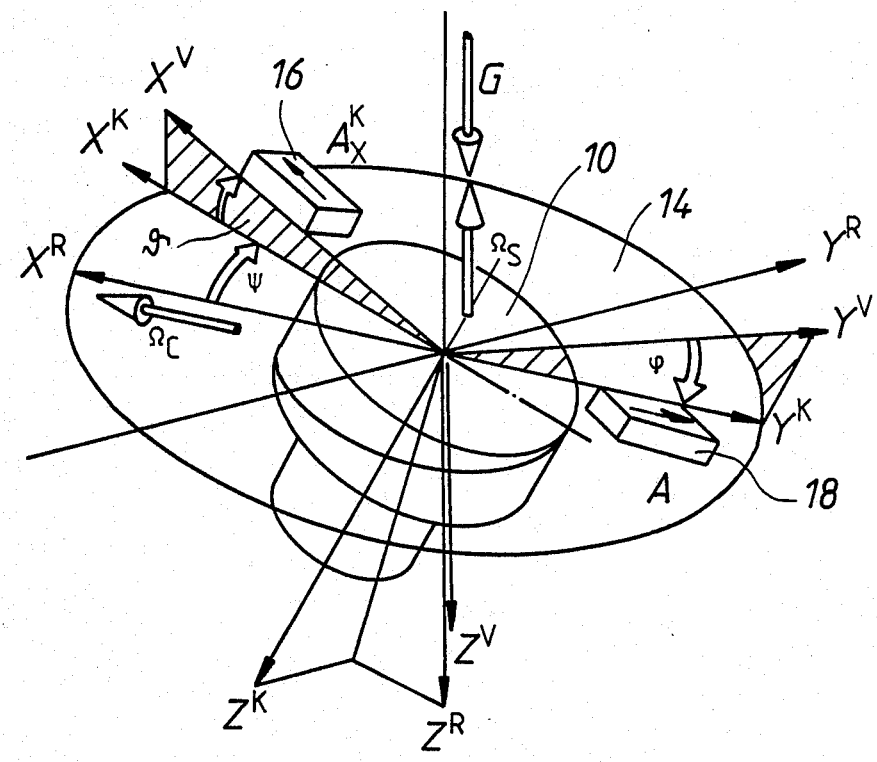
FIG. 2 shows an arrangement of the rate gyro and of accelerometric means in the form of two accelerometers aligned with the input axes of the rate gyro, with the spin axis of the rate gyro not aligned horizontally.

In FIG. 2 numeral 12 designates the horizontal plane. The horizontal component $\Omega_c$ of the rotary speed lies in the horizontal plane. The vertical component $\Omega_s$ of the rotary speed of the earth points to the top, perpendicularly to this plane. The vector of the acceleration due to gravity G points to the bottom, also perpendicularly to this plane. The earth-fixed coordinate system comprises the coordinate axis $Z^R$ directed vertically to the bottom as well as the earth-fixed coordinate axes $X^R$ (north) and $Y^R$ (east) lying in the plane 14. The spin vector of the rate gyro 10 lies in the direction of the axis $Z^K{}_K$ of a gyro-fixed coordinate system with the axis $Z^K$ and the axes $X^K$ and $Y^K$ mutually orthogonal and perpendicular to this axis, axes $X^K$ and $Y^K$ corresponding to the input axes of the two-axis rate gyro. The axes $X^V$ and $Y^V$ result from perpendicular projection of the axes $X^K$ and $Y^K$ of the gyro-fixed coordinate system on the plane 14, axes $X^V$ and $Y^V$ being perpendicular to a coordinate axis $Z^V$ coinciding with the earth-fixed vertical $Z^R$, in the plane 14. Looked for is the angle between the vertical plane extending through the north direction $X^R$ and a vertical plane extending through the input axis $X^K$ of the gyro 10, as illustrated in FIG. 2.

The sensor arrangement comprises two accelerometers 16 and 18, similar to DE-B-No. 27 41 274, which respond to accelerations (including the acceleration due to gravity) in the directions of the input axes $X^K$ and $Y^K$, respectively, of the rate gyro 10.

Figure 3:
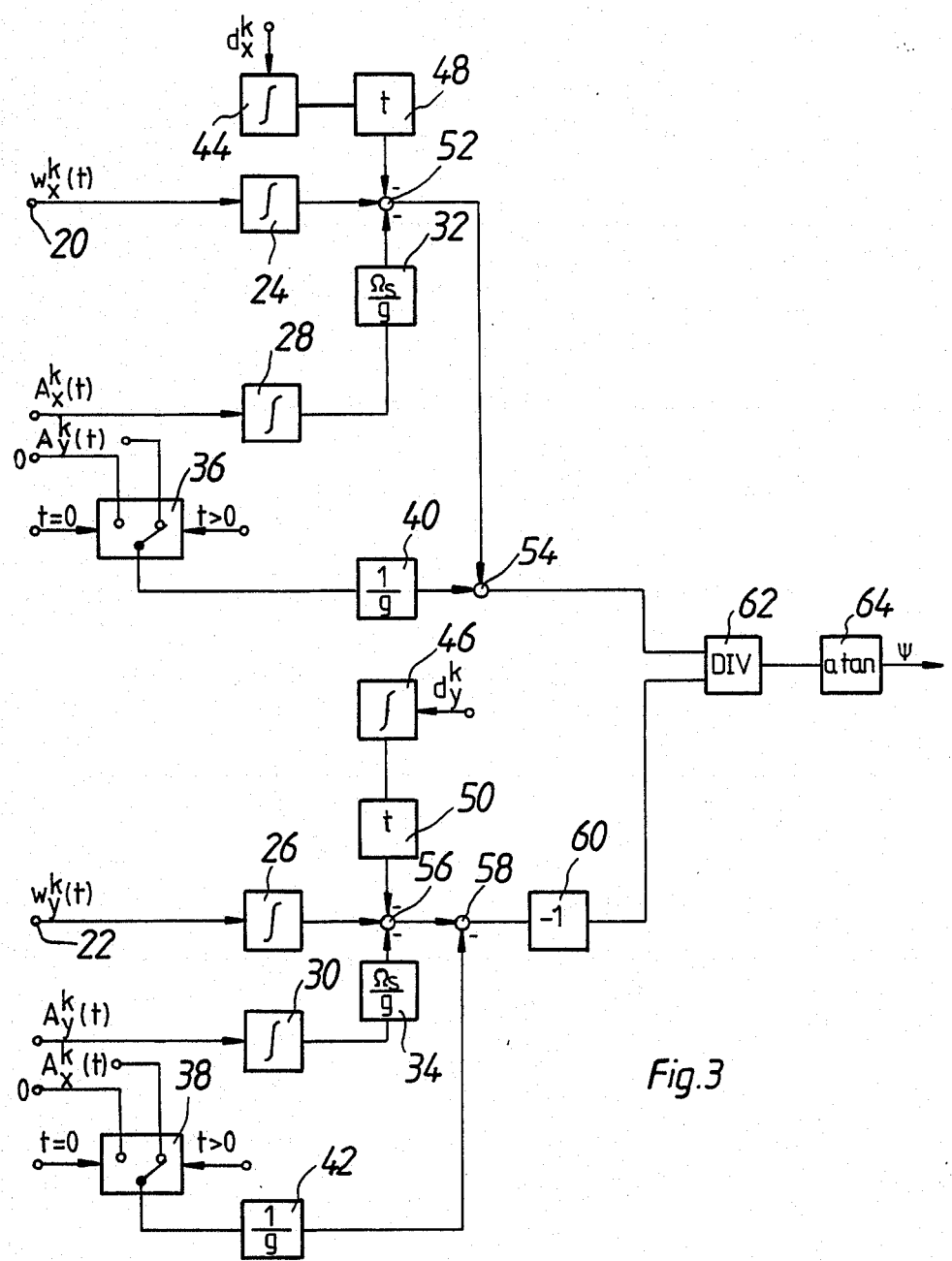
FIG. 3 shows a first embodiment of the signal processing means in a block diagram in which a signal corresponding to the tangent of the azimuth angle is generated by forming the quotient of two quantities of the dimensions of angles, these quantities being obtained mainly by integration with respect of time of the rate gyro signals which are proportional to the angular rates.

The rate gyro 10 in FIG. 2 provides a signal $w_x{}^k(t)_k$ as rotary speed about the input axis X and a signal $w_y{}^k(t)$ as rotary speed about the input axis $Y^K$. These signals are supplied to inputs 20 and 22, respectively, of the signal processing means of FIG. 3. The two signals of the rate gyro are integrated with respect to time as illustrated by blocks 24 and 26, respectively. Thereby a signal is obtained having the dimension of an angle. The signals $A_x{}^K(t)$ and $A_y{}^K(t)$ are also integrated with respect to time as indicated by blocks 28 and 30, respectively. The signal obtained in this way is multiplied with the ratio of the vertical component s of the rotary speed of the earth and the amount q of the vector G of the acceleration due to gravity. This is indicated by blocks 32 and 34, respectively. Here also a signal is obtained having the dimension of an angle. Furthermore the acceleration siqnals at a moment t>>0 (illustrated by the switches 36 and 38, respectively) are divided by the acceleration due to gravity q, as illustrated by blocks 40 and 42, respectively. Here also a quantity is obtained as ratio of acceleration to acceleration due to gravity having the dimension of an angle. Further correction signals will be derived from the drifts $d_x{}^k$ and $d_y{}^k$ assumed to be known. These drifts are memorized in the memories 44 and 46, respectively. The memories 44 and 46 are illustrated in FIG. 3 as integrators to which the drifts are applied as initial conditions, the input of these memories for the rest, being zero. The outputs of the memories 44 and 46, respectively, are multiplied with the integration time, proceeding from a starting condition, as indicated by the blocks 48 and 50, respectively. The acceleration signal $A_x{}^K(t)$ integrated and multiplied by the ratio of the vertical component of the rotary speed of the earth and the acceleration due to gravity as the first correction signal and the drift $d_x{}^k$ memorized in the memory 44 multiplied by the time t as a further correction signal, are subtracted from the integrated signal of the rate gyro 10 at input 20 in a summing point 52. In a summing point 54 the acceleration $A_y{}^K$ (t) divided by the acceleration g due to gravity is also subtracted as correction signal.

In similar manner, on the one hand, the acceleration signal $A_y{}^K$ (t) of the accelerometer 18 integrated and multiplied by the ratio of the vertical component of the rotary speed of the earth and the acceleration due to gravity, and on the other hand, the drift multiplied by time and memorized in the memory 46 is subtracted in a summing point 56 from the second signal of the rate gyro 10 applied to the input 22 which is integrated according to block 26. In a summing point 58 the acceleration signal $A_x{}^K$(t) divided by the acceleration due to gravity is furthermore subtracted as a further correction signal. The sign of the signal obtained in this way is inverted as illustrated by block 60. In this way two corrected rate gyro signals are generated by signals obtained from the rate gyro 10. The signals are divided by one another as illustrated by block 62. The quotient obtained in this way is proportional to the tangent of the azimuth angle $\Psi$. Therefrom the angle $\Psi$ is obtained by forming the arcus tangent as illustrated by block 64.

Here the angle $\Psi$ is formed from the signals integrated with respect to time. Directly applying the acceleration signals divided by the acceleration due to gravity, which is a measure of the respective angle of inclination, corresponds to the integrated change of the angle, therefore an integrated angular rate. The integrated acceleration multiplied by the ratio of vertical component of the rotary speed of the earth to the acceleration due to gravity provides a respective correction signal for the component of the vertical component falling into the direction of the respective input axis of the rate gyro. Applying the acceleration divided by the acceleration due to gravity provides a respective correction signal for the rotary speed of the carrier relative to the earth due to rotary disturbances. Thus the influences of rotary vibrations of the carrier or other rotary disturbances are compensated for by this correction signal. A further correction signal compensates for the drift of the rate gyro about the respective input axis.

Figure 4:
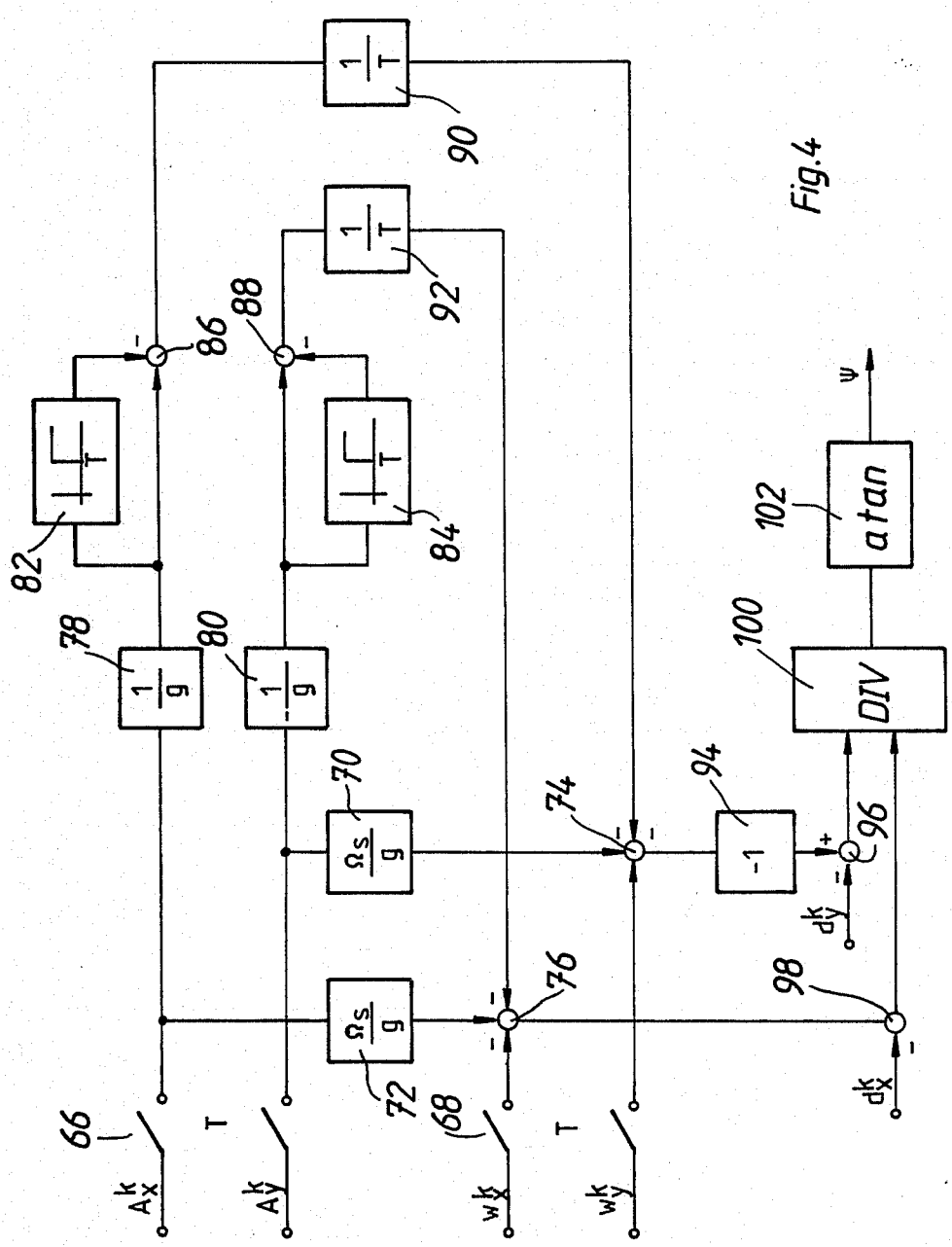
FIG. 4 shows another embodiment of the signal processing means in which a signal corresponding to the tangent of the azimuth angle is formed by division of two measuring quantities of the dimensions of angular rates.

In the embodiment according to FIG. 4 the acceleration signals $A_x{}^K$, $A_y{}^K$ as well as the signals $w_x{}^k$ and $W_y{}^k$ of the rate gyro 10 are scanned with a clock time T and are digitized. This is illustrated by switches 66 and 68. The acceleration signals obtained in this way are multiplied by the ratio of vertical rotary speed of the earth and the acceleration due to gravity, as illustrated by blocks 70 and 72, respectively, and are subtracted from the signals $w_y{}^k$ and $w_x$, respectively, of the rate gyro 10. Furthermore the acceleration signals $A_x{}^K$ and $A_y{}^K$ are multiplied by 1/g and $-1/g$, respectively, as illustrated by the blocks 78 and 80, respectively. The signals obtained in this way are equal to the ratio of acceleration and acceleration due to gravity, they provide therefore a measure of the angle of inclination. Means 82 and 84, respectively, are provided by which the scanned and divided acceleration signals can be delayed by one clock interval. The differences of the delayed and undelayed, divided acceleration signals are formed in the summing points 86 and 88, respectively. The differences obtained in this way are divided by the clock time T as indicated by the blocks 90 and 92, respectively. This signal processing corresponds to a differentiation such that a correction signal is generated which is proportional to the derivative with respect to time of the angles of inclination, therefore represents the rotary speeds caused by the changing of the position of the carrier.

This signal is subtracted in the associated summing point 74 and 76, respectively, from the signal of the rate gyro 10 as a further correction signal. The sign of the signal from the summing point 74 is inverted as illustrated by block 94. In the summing points 96 and 98, respectively, the drifts $d_x{}^k$ and $d_y{}^k$, respectively, are furthermore subtracted from the signals obtained in this way as further correction signals. In this way corrected rate gyro signals are obtained which, as illustrated by block 100, are divided by one another whereby the tangent of the azimuth angle $\Psi$ is obtained. The arcus tangent is formed by appropriate means and thus the azimuth angle $\Psi$ itself is obtained.

Instead of a two-axis rate gyro also two one-axis rate gyros can be provided as rotary speed sensor means. Finally the rotary speed sensor means can also be formed by optical rotation sensors.

Figure 5:
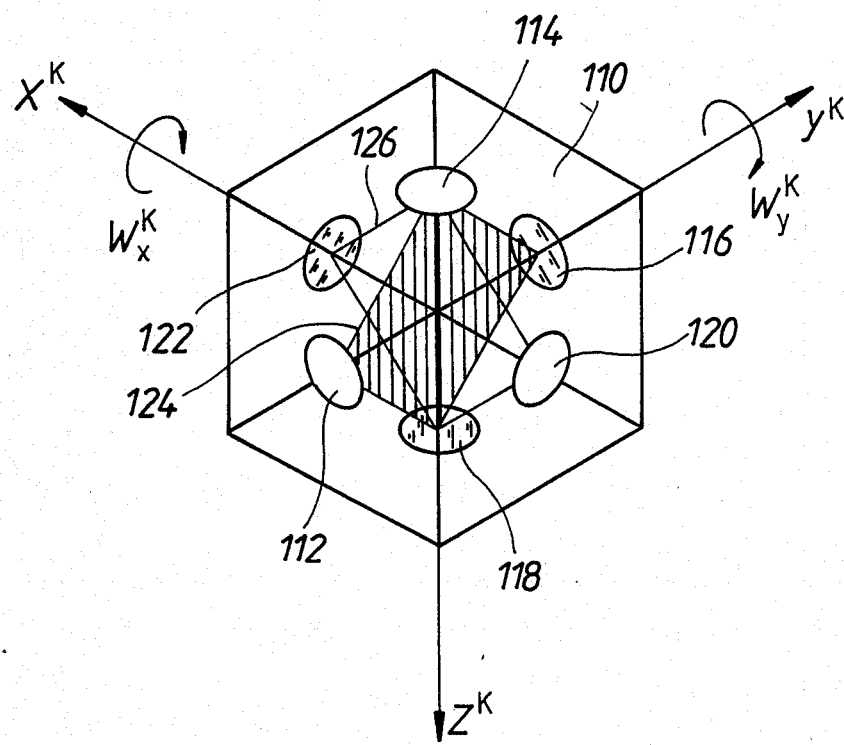
FIG. 5 shows a modified embodiment of two-axis rotary speed sensor means.

A prefered arrangement of two-axis optical rotary speed sensor means which can be used instead of the rate gyro of FIG. 1 is illustrated schematically in FIG. 5.

The two substantially horizontal input axes are again designated by $x^K$ and $y^K$ Perpendicular thereto extends an axis $z^K$ which in this case is of course no spin axis. A glass cube 110 is arranged such that its edges are extending parallelly to said axes $x^K$, $y^K$ or $z^K$ Six mirrors 112, 114, 116, 118, 120 and 122 are located on the side faces of the glass cube. By these six mirrors two closed quadrangular light paths 124 and 126 are determined. The light path 124 is reflected by the mirrors 112, 114, 116 and 118 in one plane which is perpendicular to the input axis $x^K$. The light path 126 is reflected by the mirrors 114, 120, 118 and 122 in one plane which is perpendicular to the input axis $y^K$. The two light paths 124 and 126 form optical resonators of ring laser gyros in a known manner which therefore is not described in further detail. The arrangement can be, for example, that of DE-A-No. 33 30 660, U.S. Pat. No. 4,135,822 or U.S Pat. No. 4,274,742. It is essential that the rotary speeds of two axes $x^K$ and $v^K$. which are mutually orthogonal can also be measured by such ring laser gyros.

It is of course possible to provide two separated one-axis optical rotary speed sensor means which are arranged mutually orthogonal, instead of the two-axis optical rotary speed sensor described in conjunction with FIG. 5.

I claim:

1. A device for determining the north direction comprising:
   (a) two-axis rotary speed sensor means, which are arranged carrier-fixed and have a first input axis and a second input axis, said second input axis being perpendicular to said first input axis, said two input axes defining a plane which in operation is at least approximately horizontal, said rotary speed sensor means providing first and second output signals indicative of rotary speed about said first and second input axes, respectively,
   (b) first accelerometer means which respond to acceleration parallel to said first input axis and provide a first acceleration signal indicative of the acceleration sensed by said first accelerometer means along said first input axis,
   (c) second accelerometer means which respond to acceleration parallel to said second input axis an provide a second acceleration signal indicative of the acceleration sensed by said second accelerometer means along said second input axis, (d) means for forming from said first acceleration signal a first correction signal indicative of the component, effective about said first input axis due to the inclination of said first input axis, of the vertical component of the rotary speed of the earth, (e) means for forming from said second acceleration signal a second correction signal indicative of the component, effective about said second input axis due to the inclination of said second input axis, of the vertical component of the rotary speed of the earth, (f) means for forming from said first acceleration signal a third correction signal indicative of the angular motion of said carrier relative to earth about said first input axis, (g) means for forming from said second acceleration signal a fourth correction signal indicative of the angular motion of said carrier relative to earth about said second input axis, (h) means for subtracting said first and third correction signal from said first output signal of said rotary speed sensor means to provide a first corrected output signal, (i) means for subtracting said second and fourth correction signals from said second output signal of said rotary speed sensor means to provide a second corrected output signal, and (j) means for forming the quotient of said first and second corrected output signals to provide a signal indicative of the deviation of said first input axis from North.

2. A device as set forth in claim 1 wherein the rotary speed signals are additionally superposed by one correction signal each which takes into account the known drifts ($d_x^k$, $d_y^k$) of the rotary speed sensor means (10).

3. A device for determining the north direction, comprising
(a) two-axis rotary speed sensor means (10) which are arranged carrier-fixed (strapdown) having a first input axis an a second input axis ($X^k$, $Y^k$) perpendicular to the first on in a plane which is at least approximately horizontal,
(b) first accelerometric means (16) which respond to acceleration ($A_y^k$) in the direction of the first input axis ($X^k$),
(c) second accelerometric means (18) which respond to acceleration ($A_y^k$) in the direction of the second input axis ($Y^k$),
(d) signal processing means to which the signals of the rotary speed sensor means (10) and of the accelerometric means (16, 18) are supplied for generating an output signal indicative of the angle between a reference direction and north ($X^R$),
wherein
(e) the signals ($W_y^k$, $W_y^k$) obtained from the rotary speed sensor means (10) by the signal processing means, which signals would be proportional to the components of the horizontal component ($\Omega_c$) of the rotary speed of the earth falling into the directions of the input axes ($X^k$, $Y^k$) if the plane of the input axes were exactly horizontally aligned, are superposed by correction signals derived from the associated accelerometric means (16, 18) when said plane is not aligned horizontally, said correction signals compensating (e1) components of the vertical component of the rotary speed of the earth falling into the direction of the input axes ($Y^k$, $Y^k$) and
(e2) the rotary speed of the carrier relative to the earth, and (f) wherein the signal processing means comprises quotient forming means (62, 100) to form the quotient of the corrected rotary speed signals to provide a signal indicative of the deviation of said first input axis from North, wherein the signal processing means for each input axis ($X^k$, $Y^k$) comprises (g) means (24, 26) for integrating with respect to time and signal ($W_x^k$, $W_y^k$) from the rotary speed sensor means (10) to generate said signal obtained from the rotary speed sensor means (10), (h) means (28, 30) for integrating with respect to time the acceleration signal ($A_x$, $A_y$) associated with the respective input axes ($X^k$, $Y^k$) from the accelerometric means (16, 18), (i) means (32, 34) for multiplying the integrated acceleration signal by the ratio of the vertical component ($\Omega_s$) of the rotary speed of the earth and the acceleration due to gravity (g), (j) means (40) for dividing acceleration signal associated with the respective input axis ($X^k$, $Y^k$) by the acceleration due to gravity (g), and (k) means (52, 56 and 54, 58, respectively) for subtracting said multiplied and integrated acceleration signal and said acceleration signal multiplied by the acceleration due to gravity as correction signals from the integrated signal of the rotary speed sensor means (10) to generate the corrected rotary speed signal.

4. A device as set forth in claim 3 further comprising
(a) means (44, 46) for memorizing the gyro drift ($d_x^k$, $d_y^k$) of the rotary speed sensor means,
(b) means (48, 50) for multiplying the memorized drifts by the time (T), and
(c) means (52, 56) for subtracting the product obtained in such way as a further correction signal from the integrated signal of the rotary speed sensor means (10).

5. A device as set forth in claim 3 wherein the signal processing means comprise for each input axis ($X^k$, $Y^k$)
(a) means (68) for sampling the signals from the rotary speed sensor means (10) at a given clock frequency to generate said signals obtained from the rotary speed sensor means, as well as
(b) means (66) for sampling the signals from the accelerometers (16, 18) at the given clock frequency,
(c) means (70, 72) for multiplying the sampled acceleration signals with the quotient of the vertical component of the rotary speed of the earth and acceleration due to gravity,
(d) means (78, 80) for dividing the scanned acceleration signals by the acceleration due to gravity (g),
(e) means (82, 84) for delaying the sampled and divided acceleration signals by one clock interval (T),
(f) means (86, 88) for subtracting the undelayed and the delayed divided acceleration signals,
(g) means (90, 92) for dividing the differences obtained in such way by the clock time (T), and
(h) means (74, 76) for subtracting said multiplied acceleration signals and said divided differences as correction signal from the scanned signals of the rotary speed sensor means (10) to generate said corrected rotary speed signals.

6. A device as set forth in claim 5, wherein the drift signals ($d_x^k$, $d_y^k$) as further correction signals are subtracted from the sample signals of the rotary speed sensor means.

* * * * *